(12) United States Patent
Larson et al.

(10) Patent No.: US 11,532,964 B2
(45) Date of Patent: Dec. 20, 2022

(54) GENERATOR ROTOR FLAT WIRE WINDING

(71) Applicant: Hamilton Sundstrand Corporation, Charlotte, NC (US)

(72) Inventors: Eric Alan Larson, Rockford, IL (US); Brady A. Manogue, Beloit, WI (US); David S. Behling, Belvidere, IL (US); Andrew P. Grosskopf, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 340 days.

(21) Appl. No.: 16/749,764

(22) Filed: Jan. 22, 2020

(65) Prior Publication Data

US 2021/0226502 A1    Jul. 22, 2021

(51) Int. Cl.
  *H02K 3/51* (2006.01)
  *H02K 7/04* (2006.01)
  *H02K 17/42* (2006.01)

(52) U.S. Cl.
  CPC ............ *H02K 3/51* (2013.01); *H02K 7/04* (2013.01); *H02K 17/42* (2013.01)

(58) Field of Classification Search
  CPC ...... H02K 1/24; H02K 17/42; H02K 2203/03; H02K 3/51; H02K 3/527; H02K 7/04
  See application file for complete search history.

(56) References Cited

U.S. PATENT DOCUMENTS

| 4,720,646 | A  | * | 1/1988 | Torimoto | H02K 3/525 310/194 |
| 2006/0232143 | A1 |   | 10/2006 | Purvines et al. | |
| 2010/0176683 | A1 | * | 7/2010 | Waddell | H02K 3/527 29/598 |
| 2011/0068525 | A1 | * | 3/2011 | Sterle | H02K 15/063 269/8 |
| 2013/0307359 | A1 | * | 11/2013 | Vitello | H02K 3/505 310/71 |
| 2017/0126090 | A1 |   | 5/2017 | Chen et al. | |

FOREIGN PATENT DOCUMENTS

| EP | 1724904 | A2 |   | 11/2006 | |
| EP | 2182615 | A2 | * | 5/2010 | H02K 3/50 |
| EP | 3046233 | A1 |   | 7/2016 | |
| EP | 3758201 | A1 | * | 12/2020 | H02K 11/042 |
| GB | 666745 | A |   | 2/1952 | |

OTHER PUBLICATIONS

Extended European search report issued in corresponding EP applicaton No. 21152972.2, dated Jun. 10, 2021.

* cited by examiner

*Primary Examiner* — Naishadh N Desai
(74) *Attorney, Agent, or Firm* — Locke Lord LLP; Joshua L. Jones; Scott D. Wofsy

(57) ABSTRACT

A generator including a stator winding, a rotor positioned radially inside the stator winding, including multiple coil assemblies each using a flat wire, a primary termination plate residing radially inside the rotor configured to connect a wire of a coil assembly to an adjacent wound coil and a secondary termination plate residing radially inside the rotor configured to connect a wound coil to an adjacent wound coil and connect the wound coil to a terminus connection.

15 Claims, 2 Drawing Sheets

GENERATOR ROTOR FLAT WIRE WINDING

BACKGROUND

Technological Field

The present disclosure relates to generator wiring, and more particularly to a means of connecting flat wire windings in a generator rotor assembly.

Description of Related Art

A variety of options are used when wiring generators. Flat wires have power density advantages over round wires. However, having flat wires requires installation and securing of the wires using differing terminations from the typical terminations, as with round wires.

The conventional methods and systems have generally been considered satisfactory for their intended purpose. However, there is still a need in the art for generator assemblies with flat wires having improved balancing, symmetry, and reliability. There also remains a need in the art for such assemblies and components that are economically viable. The present disclosure may provide a solution for at least one of these remaining challenges.

SUMMARY OF THE INVENTION

A generator including a stator winding, a rotor positioned radially inside the stator winding, including multiple coil assemblies each using a flat wire, a primary termination plate residing radially inside the rotor configured to connect a wire of a coil assembly to an adjacent wound coil, and a secondary termination plate residing radially inside the rotor configured to connect a wound coil to an adjacent wound coil and connect the wound coil to a terminus connection. The generator can include a second primary termination plate and a second secondary termination plate. Each of the termination plates can affix wires from three adjacent coils. The primary termination plate and the secondary termination plate can have an equal weight.

The termination plates can include three radially directed channels configured for receiving wires of coils and affixing them in place. The secondary termination plate can include a curved channel configured for accepting a single wire of a single coil and affixing it to a round wire then attaching the round wire with a fastener. The secondary termination plate can include a fastener configured to secure a wire to the termination plate.

The generator can further include a second secondary termination plate. The second secondary termination plate and the secondary termination plate can be positioned opposite each other, and the primary termination plate and the secondary termination plate are adjacent to each other. Each of the termination plates can be machined from a non-conductive material. The secondary termination plate can include a round wire coupled to a fastener.

A series of clips can couple the flat wires of each coil assembly to the flat wires of an adjacent coil assembly and the round wire can be coupled to the flat wire by a securing the wire together at two locations. The termination plates are not coupled to each other.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
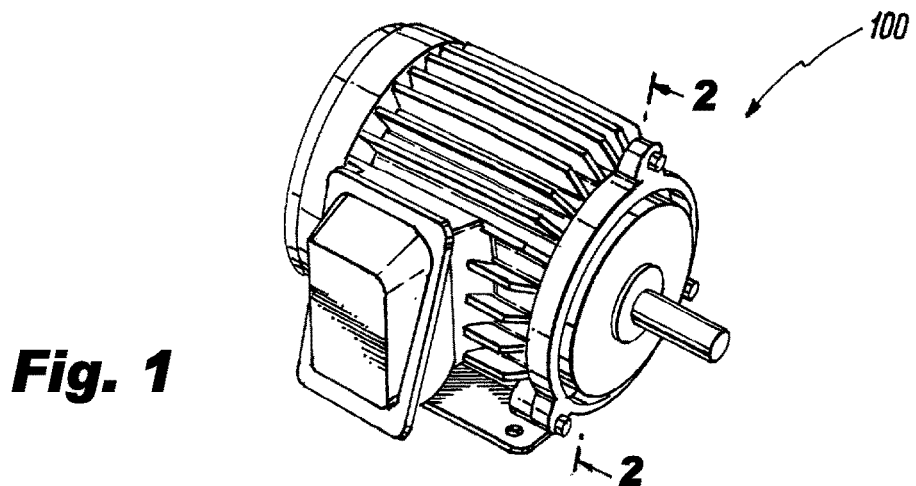
FIG. 1 is an isometric view of a generator with a flat wire rotor winding.

Reference will now be made to the drawings wherein like reference numerals identify similar structural features or aspects of the subject invention. For purposes of explanation and illustration, and not limitation, a partial view of an exemplary embodiment of a rotor assembly in accordance with the invention is shown in FIG. 1 and is designated generally by reference character 100. Other embodiments of the rotor assembly in accordance with the invention, or aspects thereof, are provided in FIG. 2 as will be described. The methods and systems of the invention can be used to improve on symmetry and balance of the rotor during use.

Figure 2:
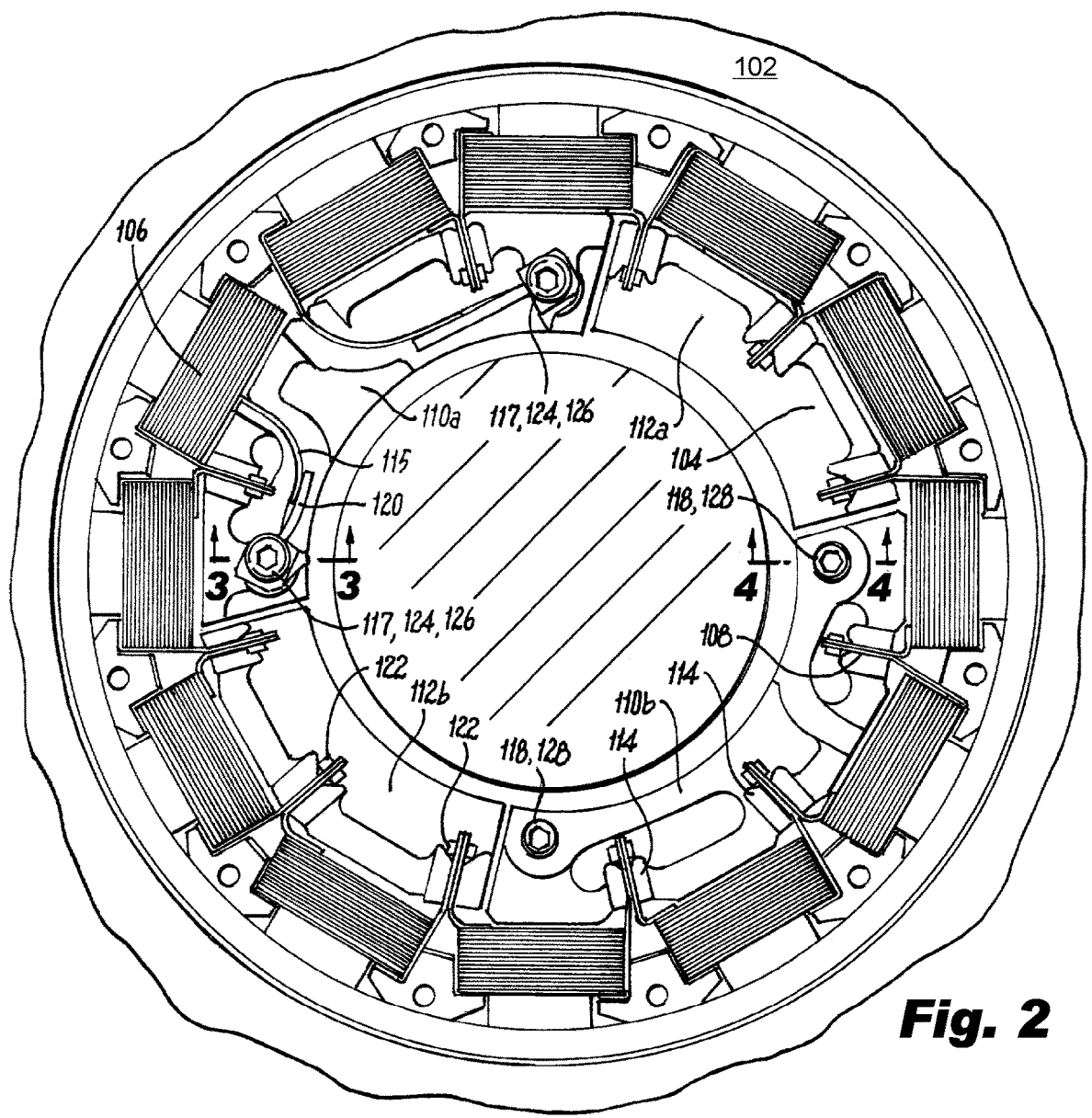
FIG. 2 is a front view of the rotor face.

FIG. 1 shows a generator 100 with inner parts including a stator winding 102, and a rotor 104 positioned radially inside the stator winding 10 shown in FIG. 2. The rotor 104 includes multiple coil assemblies 106. Each coil assembly includes a flat wire 108. Flat wires have a power density advantages over round wires and are subject to less movement during rotation.

FIG. 2 shows a primary termination plate 112a residing radially inside the rotor 104 configured to connect the wire of a coil assembly 106 to an adjacent wound coil 106, and a secondary termination plate 110a residing radially inside the rotor 104 which also connect a wound coil wire to an adjacent wound coil 106. The generator further includes a second primary termination plate 112b and a second secondary termination plate 110b. Each of the termination plates affix wires from four adjacent coils. The primary termination plates 112a/b are identical and secondary termination plates 110a/b have equal weights but have different cuts and channels 115. Therefore the secondary termination plates can be made from the same molding of a non-conductive material and be machined differently to make either plate.

FIG. 2 further shows fasteners 117 and 118. Fasteners 117 and 118 secure the flat wire to the round wire on plate 110a and provide balance to the rotor when used with counterweight 128 on plate 110b. These are detailed in FIGS. 3 and 4. The termination plates 112a/b and 110a/b are not coupled to each other. This allows for easier repair while also accommodating centrifugal forces, thermal expansion and movement due to starting and stopping. Allowing for slight movement is imperative to avoid putting stress on the flat wires and other components. The symmetrical configuration helps with balancing. Each of the termination plates 112/110 can be machined from a non-conductive material. The generator 100 can further include a second secondary type of termination plate 110*b*. The second secondary termination plate 110*b* and the first secondary termination plate 110*a* are positioned opposite each other to ensure balance of rotating weights.

FIG. 2 further shows each of the termination plates 112/110 including three radially directed channels 114 receiving flat wires 108 of coils 106 and coupling the flat wires together with clips 122 and supporting the connected wires 122 into the slots in the termination plate 110/112. The secondary termination 110 plate includes a curved channel 115 which accepts flat wire 108 which is attached to round wire 120 which is affixed it with a fastener 118 to round wire 120.

Figure 3:
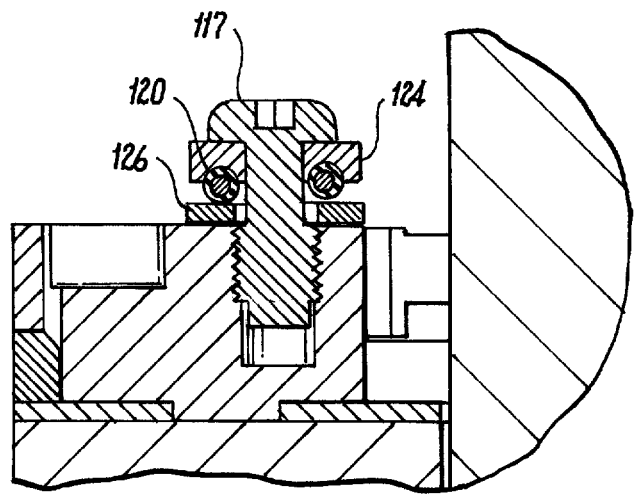
FIG. 3 is a side view of a fastener of a rotor face.

A series of clips 122 are used to secure the flat wires 108 of each coil assembly 106 to the flat wires of the adjacent coil assembly 106. With reference to FIG. 3, the round wire 120 is secured between the bus bar 126 and a conductive washer 124. The bus bar 126 is connected to a source of excitation current (not shown) from within the rotor 104.

Figure 4:
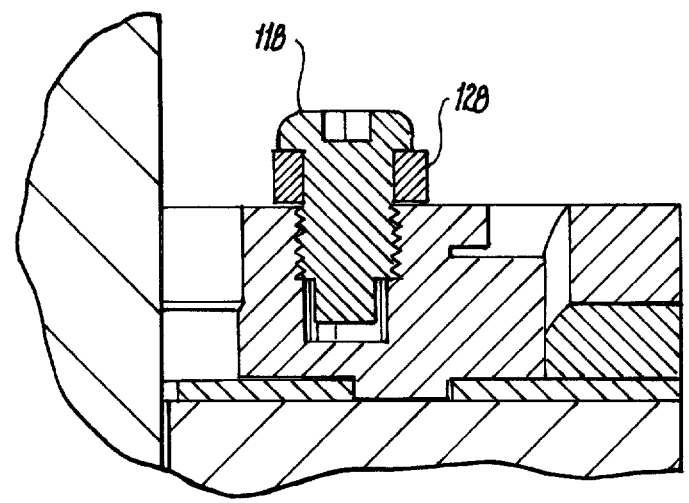
FIG. 4 is a side view of a fastener of the rotor face plate intended to balance the weight.

FIG. 4 shows counterweight 128 installed on the second secondary termination plate 110*b*. The counterweight is equivalent in mass to the conductive washer 124, bus bar 126, and round wire 120, in order to aid in creating symmetrical rotational loads during rotations of the rotor.

The methods and systems of the present disclosure, as described above and shown in the drawings, provide superior properties including increased reliability and stability, and reduced size, weight, complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A generator comprising:
   a stator winding;
   a rotor positioned radially inside the stator winding, including multiple coil assemblies each using a flat wire;
   a primary termination plate residing radially inside the rotor configured to couple the flat wire of one of the coil assemblies to the flat wire of an adjacent one of the coil assemblies;
   a secondary termination plate radially inside the rotor configured to couple the flat wire of one of the coil assemblies to the flat wire of an adjacent one of the coil assemblies, wherein the primary termination plate and the secondary termination plate are immediately circumferentially adjacent to each other.

2. The generator of claim 1, further comprising a second primary termination plate and a second secondary termination plate.

3. The generator of claim 1, wherein each of the termination plates couple wires from three adjacent coils.

4. The generator of claim 1, wherein the termination plates include three radially directed channels configured for receiving wires of coils and affixing them in place.

5. The generator of claim 1, wherein the secondary termination plate includes a curved channel configured for accepting a single flat wire of a single coil and attaching it to a round wire and affixing the round wire with a fastener.

6. The generator of claim 1, wherein the secondary termination plate includes a fastener configured to secure a wire to the termination plate.

7. The generator of claim 1, wherein the primary termination plate and the secondary termination plate have an equal weight.

8. The generator of claim 1, further comprising a second secondary termination plate.

9. The generator of claim 8, wherein the second secondary termination plate and the secondary termination plate are positioned radially opposite each other.

10. The generator of claim 1, wherein each of the channels of the termination plates are machined from a non-conductive material.

11. The generator of claim 1, wherein the secondary termination plate includes a round wire coupled to a fastener.

12. The generator of claim 11, wherein a series of clips couple the circumferentially adjacent flat wires of each coil assembly to the flat wires of a circumferentially adjacent coil assembly.

13. The generator of claim 11, wherein the round wire is coupled to the flat wire at two locations.

14. The generator of claim 1, wherein the termination plates are not coupled to each other.

15. The generator of claim 1, wherein the termination plates are all radially inward relatvie to the coil assemblies.

\* \* \* \* \*